(12) United States Patent
Mitra

(10) Patent No.: US 7,447,801 B2
(45) Date of Patent: Nov. 4, 2008

(54) COMPOSABLE DATA STREAMS FOR MANAGING FLOWS

(75) Inventor: Kanchan Mitra, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 733 days.

(21) Appl. No.: 10/298,846

(22) Filed: Nov. 18, 2002

(65) Prior Publication Data

US 2004/0098498 A1 May 20, 2004

(51) Int. Cl.
*G06F 15/16* (2006.01)
*G06F 15/173* (2006.01)

(52) U.S. Cl. .................. 709/246; 709/204; 709/231; 709/238; 709/247

(58) Field of Classification Search ................ 709/232, 709/231, 218, 226
See application file for complete search history.

(56) References Cited

U.S. PATENT DOCUMENTS

| | | | | |
|---|---|---|---|---|
| 5,815,707 | A * | 9/1998 | Krause et al. ............... | 719/321 |
| 6,119,167 | A * | 9/2000 | Boyle et al. ................ | 709/234 |
| 6,167,451 | A * | 12/2000 | Stracke, Jr. ................ | 709/230 |
| 6,173,327 | B1 * | 1/2001 | De Borst et al. ............ | 709/231 |
| 6,405,237 | B1 * | 6/2002 | Khalidi et al. .............. | 709/231 |
| 6,546,428 | B2 * | 4/2003 | Baber et al. ................ | 709/232 |
| 6,680,938 | B1 * | 1/2004 | Hammermeister et al. .. | 370/360 |
| 6,957,219 | B1 * | 10/2005 | Lin et al. ..................... | 707/10 |
| 6,970,939 | B2 * | 11/2005 | Sim ........................... | 709/236 |
| 2002/0023156 | A1 * | 2/2002 | Chujo et al. ................ | 709/226 |
| 2002/0056004 | A1 * | 5/2002 | Smith et al. ................ | 709/227 |
| 2002/0073205 | A1 * | 6/2002 | Mostafa ..................... | 709/227 |
| 2002/0099844 | A1 * | 7/2002 | Baumann et al. ........... | 709/232 |
| 2002/0161908 | A1 * | 10/2002 | Benitez et al. ............. | 709/231 |
| 2002/0165724 | A1 * | 11/2002 | Blankesteijn .............. | 705/1 |
| 2003/0061332 | A1 * | 3/2003 | Narad et al. ............... | 709/223 |
| 2003/0093592 | A1 * | 5/2003 | Allison ...................... | 710/36 |
| 2006/0059230 | A1 * | 3/2006 | Dykas et al. ............... | 709/206 |

OTHER PUBLICATIONS

"Manipulators for Console I/O," Al Williams, C Users Journal, Nov. 1992, pp. 45-56.
"The iostream Mechanism," Ken Arnold, Unix Review, May 1993, pp. 91-98.
"Clipboard Support via IStream," Todd Anderson, Windows Developer's Journal, May 1999, pp. 49-52.
"Wading Seat into OLE," Andy Barnhart, Software Development, May 1995, pp. 77-80.

* cited by examiner

*Primary Examiner*—John Follansbee
*Assistant Examiner*—Hassan Phillips
(74) *Attorney, Agent, or Firm*—Birch, Stewart, Kolasch & Birch, LLP

(57) ABSTRACT

A stream pipeline framework is supported that operates on sequential stream implementations. The stream pipeline framework comprises a chained configuration of push streams and pull streams. A stream may be configured as at least one functional component such as a transformer, a buffered read, a buffered write, a stream write, a stream read, a file read, and a file write. A data transformer supports a data transformation, including data deflation or inflation, encoding or decoding, encryption or decryption, filtering, or concatenation. A buffered read and a data write buffer sequential data streams in data segments. A stream read reads (pulls) sequential data from a stream, and a stream write writes (pushes) sequential data to a stream. A file read and a file write supports a stream for an entity that does not support a stream interface such as ISequentialStream.

39 Claims, 14 Drawing Sheets

COMPOSABLE DATA STREAMS FOR MANAGING FLOWS

FIELD OF THE INVENTION

The invention generally relates to managing data flow involving the transmission and transformation of documents and payloads.

BACKGROUND OF THE INVENTION

As software moves towards a model of "data-available-anywhere-anytime", the burden of storing and processing of the data moves to information servers. Fast storage and retrieval of the data becomes essential for these services to scale and host multitudes of clients using these services. The traditional file system would have sufficed for many cases. However, with sensitive data such as financial records, the data may require encryption and storage. In cases of a distribution center or a data warehouse, data may be compressed in order to conserve bandwidth before transmission to a storage device. As new proprietary formats are developed, different types of data transformers (that provide different transformations of data such as encryption and compression) may be required.

With the prior art, a data system typically loads the complete stream in memory, performs the transformation and persists it to some storage. Although this solution has some appeal because of its simplicity, it does not scale, (i.e. an application does not expand in a continuous fashion and the application's performance may not keep up (linearly) with the load), in a data-warehouse environment. The problem is compounded when multiple data transformations are required. As an example to illustrate the problem, assume that the size of a payload is 1 MB (Megabyte). The complete payload is stored into memory. In the example, assume that two data transformations (e.g. data inflation and data encryption) are required. The complete payload is retrieved from memory, inflated, and stored. Because the payload is inflated, assume that 10 MB of additional memory is required to store the inflated payload. The entire inflated payload is retrieved from memory, encrypted, and stored. Assuming that the payload is not further inflated by the encryption transformation, an additional 10 MB of memory is required. Thus, the total memory for processing one 1 MB payload is 21 MB.

The memory demands are exacerbated if a typical payload is larger and if more data transformations are required to process the payload. In a financial data system, a typical payload may be 20 MB. In the example above, the increased size of the payload corresponds to a total memory demand of 420 MB for each payload. In such a case, with 2 GB of memory, a financial data system may support only four payloads at one given time. If the number of payloads in a unit of time corresponds to more memory than can be supported by the data system, the processing of payload may need to be throttled. Moreover, the number of payloads that need to be processed by the data system may vary appreciably, particularly during the end of a financial period. Capacity planning is thus compounded with larger payloads.

The approach of prior art, as described heretofore, increases demands on the memory resources of a data system as the size of payload and the number of payloads increase. When the limits of available memory are reached, the operator may need to upgrade the memory resources. Moreover, if the payload traffic is associated with a large degree of variability, capacity planning for the data system becomes more difficult. Thus, it would be an advancement in the art to make the required amount of memory less dependent upon the size of the payload, the number of payloads, and the number of data transformations that are applied to each payload.

BRIEF SUMMARY OF THE INVENTION

The inventive method and apparatus overcome the problems of the prior art by providing a stream pipeline framework that operates on sequential stream implementations. The stream pipeline framework comprises a chained configuration of "push streams" and "pull streams". A stream may exchange data with a physical resource such as a file. A stream may be a data transformer that operates on input streams and produces an output stream for the transformed contents. Examples of transformer streams include data inflation or deflation, encoding or decoding, encryption or decryption, concatenation and filtering. A stream may be configured to act as a buffer that optimizes read and write operations by caching data in large data segments.

An embodiment of the invention supports a server network that enables a data provider to store documents into a file server or a SQL server. A client may subsequently retrieve a requested document from the server network through a web server. The embodiment utilizes the composition of data streams that reduces memory footprint and that supports scalability.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

Figure 1:
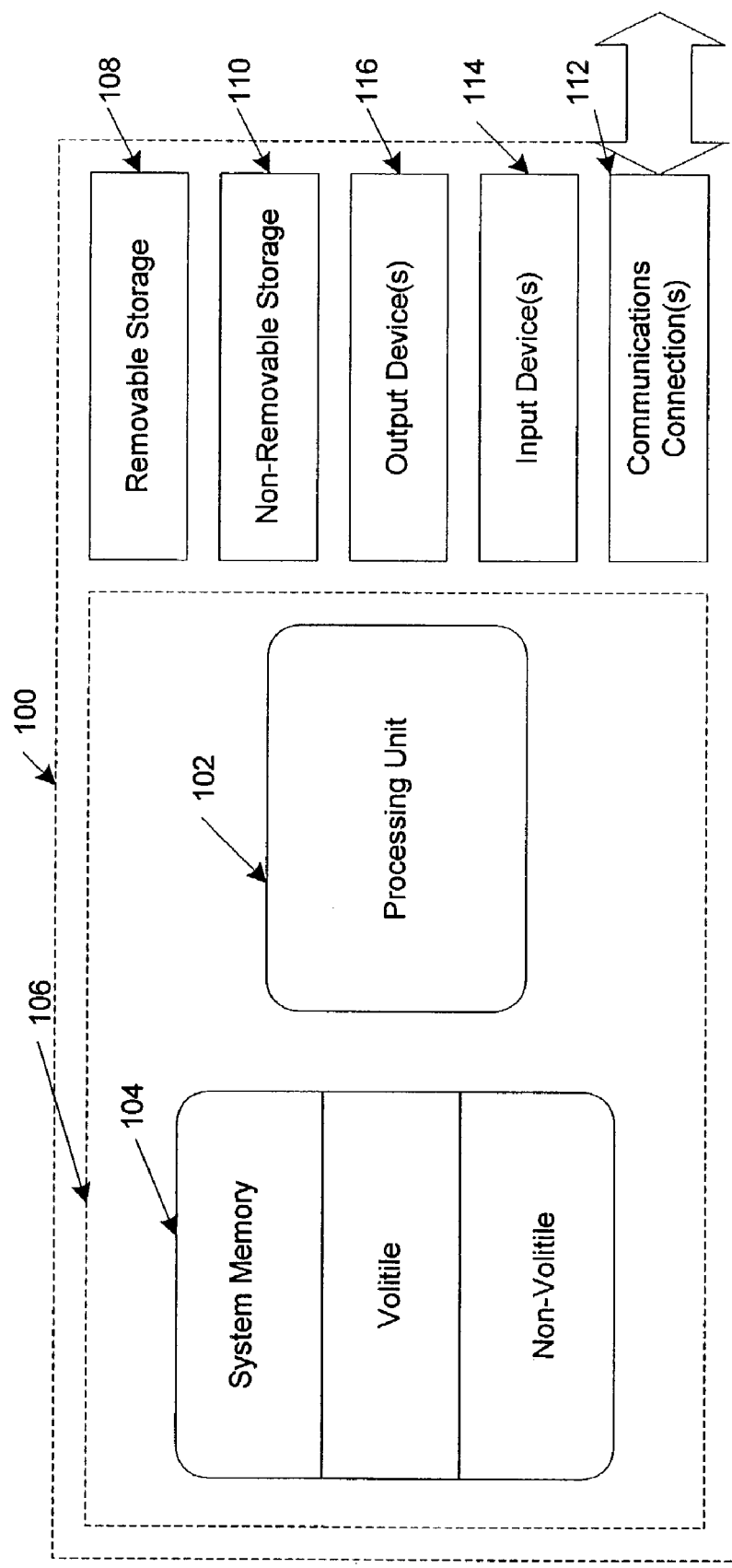
FIG. 1 illustrates an example of a suitable computing system environment on which the invention may be implemented.

With reference to FIG. 1, an exemplary system for implementing the invention includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 100. Any such computer storage media may be part of device 100.

Device 100 may also contain communications connection(s) 112 that allow the device to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 100 may also have input device(s) 114 such as keyboard, mouse, pen, voice input device, touch input device, etc. Output device(s) 116 such as a display, speakers, printer, etc. may also be included. All these devices are well known in the art and need not be discussed at length herein.

Figure 2:
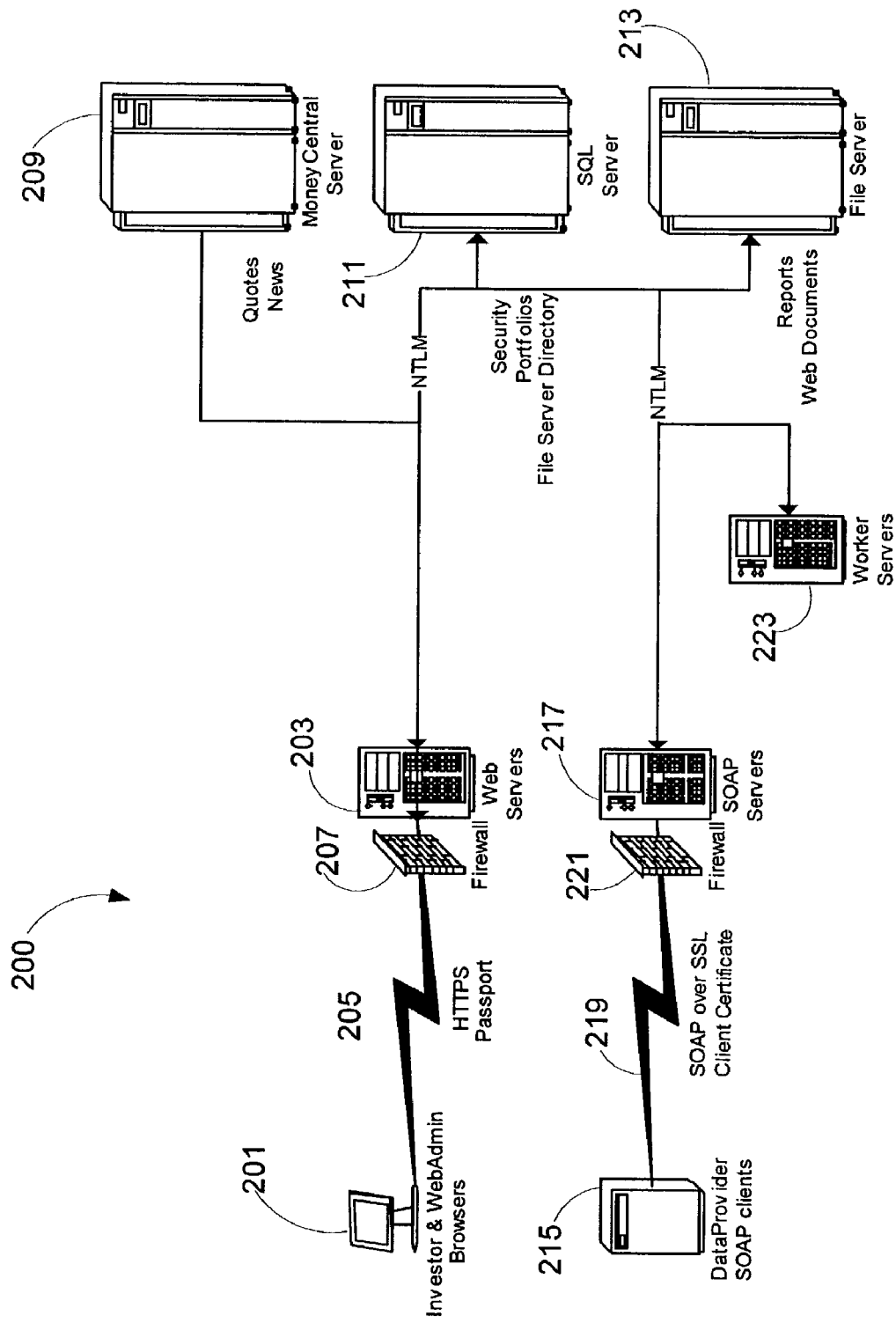
FIG. 2 shows a schematic layout of a server network in accordance with an embodiment of the invention.

FIG. 1 illustrates an example of a suitable computing system environment 100 on which the invention may be implemented. (For example, servers 203, 217, and 223, as shown in FIG. 2, may utilize computing system environment 100.) The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

FIG. 2 shows a schematic layout of a server network 200 that provides financial information to investors in accordance with an embodiment of the invention. Server network 200 comprises a news-quotes server 209, a SQL server 211, and a file server 213. In variations of the embodiment, server network 200 may support a plurality of news-quotes servers, SQL servers, or file servers. An investor, financial advisor, or web administrator accesses information from servers 209, 211, and 213 by accessing web server 203 from a browser 201 through a secure HTTP (HTTPS) connection (as may be provided by a Microsoft Passport service) and through a firewall 207.

The investor may access financial information about quotes and financial news that are not specific to the investor from news-quotes server 209. Server 209 may obtain information from different news sources (that are not shown). Also, the investor may obtain information that is specific to the investor (e.g. portfolio reports and security trades) from SQL server 211. Because the investor-specific information is private information, investor specific information is typically encrypted when stored on SQL server 211. Additionally, the investor may obtain reports and documents from file server 213. Because of the sensitivity and proprietary nature of this proprietary information, it is also typically encrypted when stored on file server 213. Web server 203 communicates with servers 211 over a connection that supports Microsoft NTLM, which is an authentication scheme for HTTP.

A data provider provides investment data (often referred to as a payload) for investors from computer 215 to a SOAP server 217 over a connection 219 that supports Simple Object Access Protocol (SOAP) through firewall 221. (With some embodiments, a plurality of SOAP servers may be supported.) The data provider typically sends investment information in data batches during off-peak hours in order to update information (e.g. by sending incremental information about changes in the investor's portfolio) or to provide a complete set of information (e.g. information about a new investor). Information comprises mostly portfolios and reports and may be uploaded in portions or in full. Investors may retrieve the information securely from the website. Information may also be enriched by augmenting the information with live quotes and news from new-quotes server 209.

Figure 3:
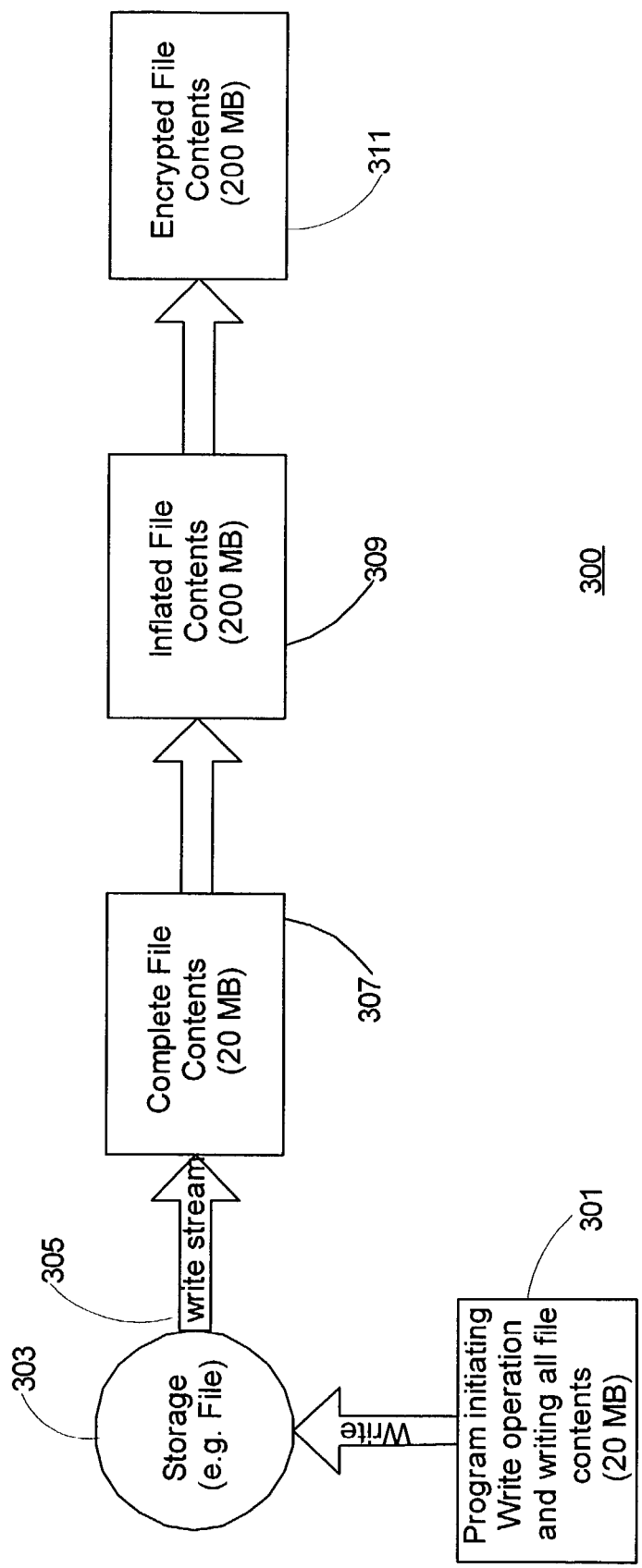
FIG. 3 illustrates an exemplary push stream configuration according to prior art.

FIG. 3 illustrates an exemplary push stream configuration 300 according to prior art. Push stream configuration 300 comprises a program 301, a storage 303, a software module 307, a software module 309, and a software module 311. In the exemplary configuration, push stream configuration 300 provides data inflation (e.g. by "unzipping" a "zipped" file in which the original data may have been compressed by 90%). When initiated by program 301, storage 303 provides a compressed file (which may be transported as a sequential stream 305) to software module 307. Software module 307 collects the contents of the compressed file from storage 303 until the complete contents are obtained (in the example the compressed file has a size of 20 MB). Software module 307 subsequently provides the complete file contents to software module 309 so that the compressed file can be inflated (uncompressed), in which the uncompressed file has a size of 200 MB. The uncompressed file is subsequently provided to software module 311 for data encryption, in which the encrypted file has a size of 200 MB (i.e. there is no further data inflation). With exemplary configuration 300, the data is transformed twice, in which the original data is inflated and then encrypted. However, configuration 300 requires 420 MB (20+200+200) of memory for buffering data. The amount of buffer space increases with the size of the buffer and the number of transformations that are performed on the data.

Figure 4:
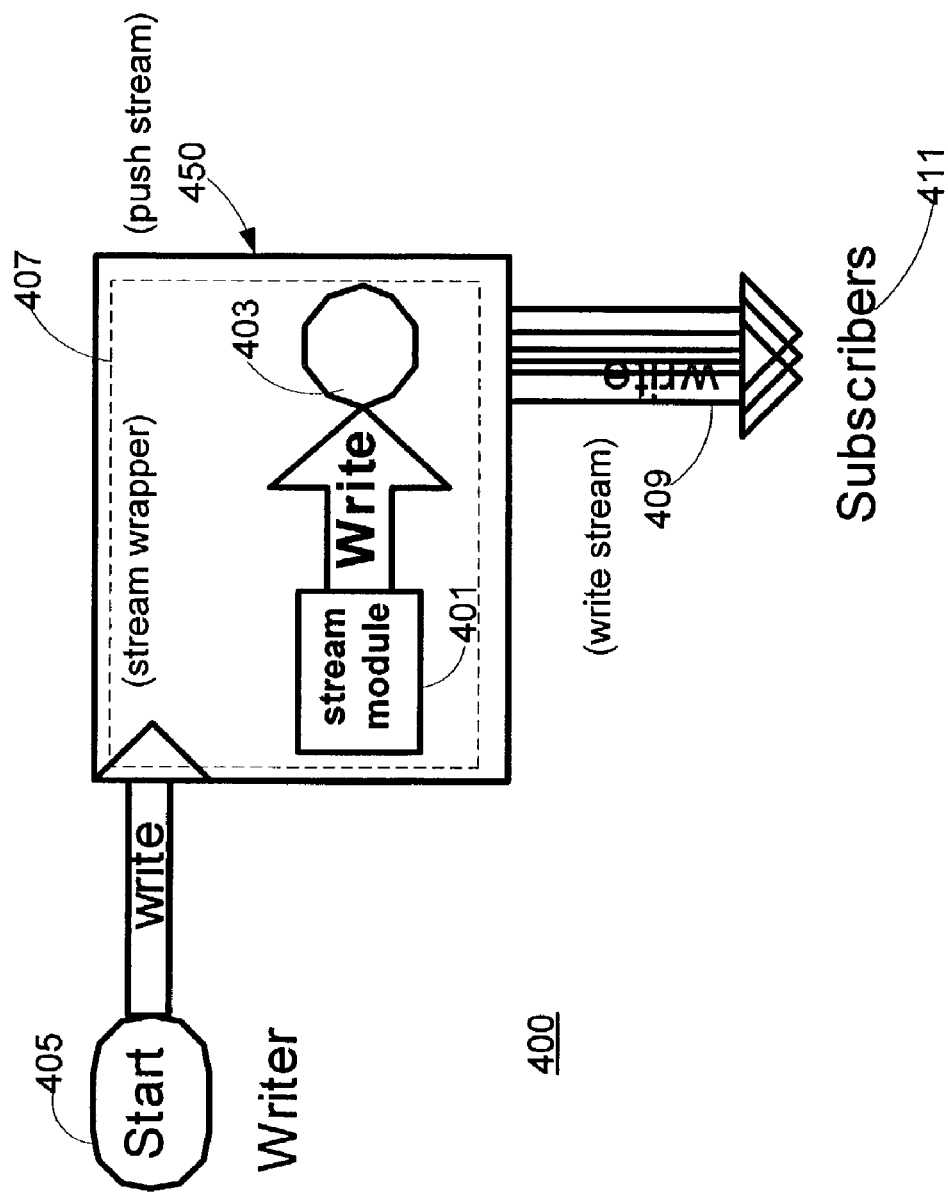
FIG. 4 shows a push stream configuration according to an embodiment of the invention.

FIG. 4 shows a push stream configuration 400 according to an embodiment of the invention. With push stream configuration 400, a writer 405 writes sequential data to a push stream 450, and push stream 450 consequently writes the sequential data to subscribers 411 through write stream 409. Writer 405 may be another push stream ("file wrapper") or file writer ("stream module") as described later. Writer 405 "pushes" data on push stream 450 to a write stream 409 to attached subscribers 411 that are "stream entities". (A "stream entity" may be a "stream module" such as a file writer or may be another "stream wrapper" that is configured as a push stream.) Subscribers 411, in turn, may have other subscribers, in which data is pushed out to the other subscribers as well.

Push stream 450 comprises a stream module 401, a file 403, and a stream wrapper 407. Stream wrapper 407 encapsulates stream module 401 and instructs stream module 401 to write an amount of data to file 403 that is presented by stream wrapper 407. Stream wrapper 407 routes data being written to write stream 409 in order to be distributed to subscribers 411.

Push stream 450 may be supported by ISequentialStream, which is a minimal stream interface for reading and writing binary large object (BLOB) data. ISequentialStream is a subset of the IStream interface and provides forward-only reading and writing of data. A write command, in which push stream 450 may be generated, may be represented by the following instruction:

HRESULT Write([in, size_is(cb)] void const *pv,[in]
ULONG cb,[out] ULONG *pcbWritten);

where pv is a pointer to data that is to be pushed, cb is the size of the data payload to be pushed, and pcbWritten is the amount of data that is actually transferred from the write operation. (The convention, as shown in FIGS. 4-14, is that the direction from tail to head of a line represents who initiated a data transfer and not the direction of data flow.)

In the embodiment, push stream wrapper 407 utilizes ISequentialStream, although other embodiments may support other stream implementations. Stream wrapper 407 intercepts calls to the underlying stream that is supported by stream module 401. As sequential data is transferred from the underlying stream, stream wrapper 407 "sniffs" the sequential data and publishes it to subscribers that are included in the subscriber list of push stream 450, corresponding to subscribers 411. Push stream 450 is configured to support subscribers 411 using IStreamConfig methods as will be discussed.

Push stream 450, as supported by ISequentialStream itself, only supports sequential streams between endpoints. Consequently, topologies are not supported with a combination (e.g. chaining) of push and pull streams. However, sequential stream software (e.g. ISequentialStream) is enhanced with a file wrapper and is configured by IStreamConfig. With the enhancement of the sequential stream software, different topologies comprising a mixture of push streams and pull streams may be configured in order to support different applications (e.g. the application shown in FIG. 2 and discussed in the context of FIGS. 13 and 14). In order to add a new subscribers to push stream 450 and to clear subscribers, the embodiment uses an AddSubscriber method and a ClearReferences method, respectively:

```
INTERFACE(IStreamConfig, IUnknown, "Stream configuration")
{
//-----------------------------------------------------------
// @cmember AddSubscriber
//
STDMETHOD(AddSubscriber)(
/* [in] */ CComStreamPtr pStream);
//-----------------------------------------------------------
// @cmember ClearReferences
//
STDMETHOD(ClearReferences)( );
};
```

Figure 5:
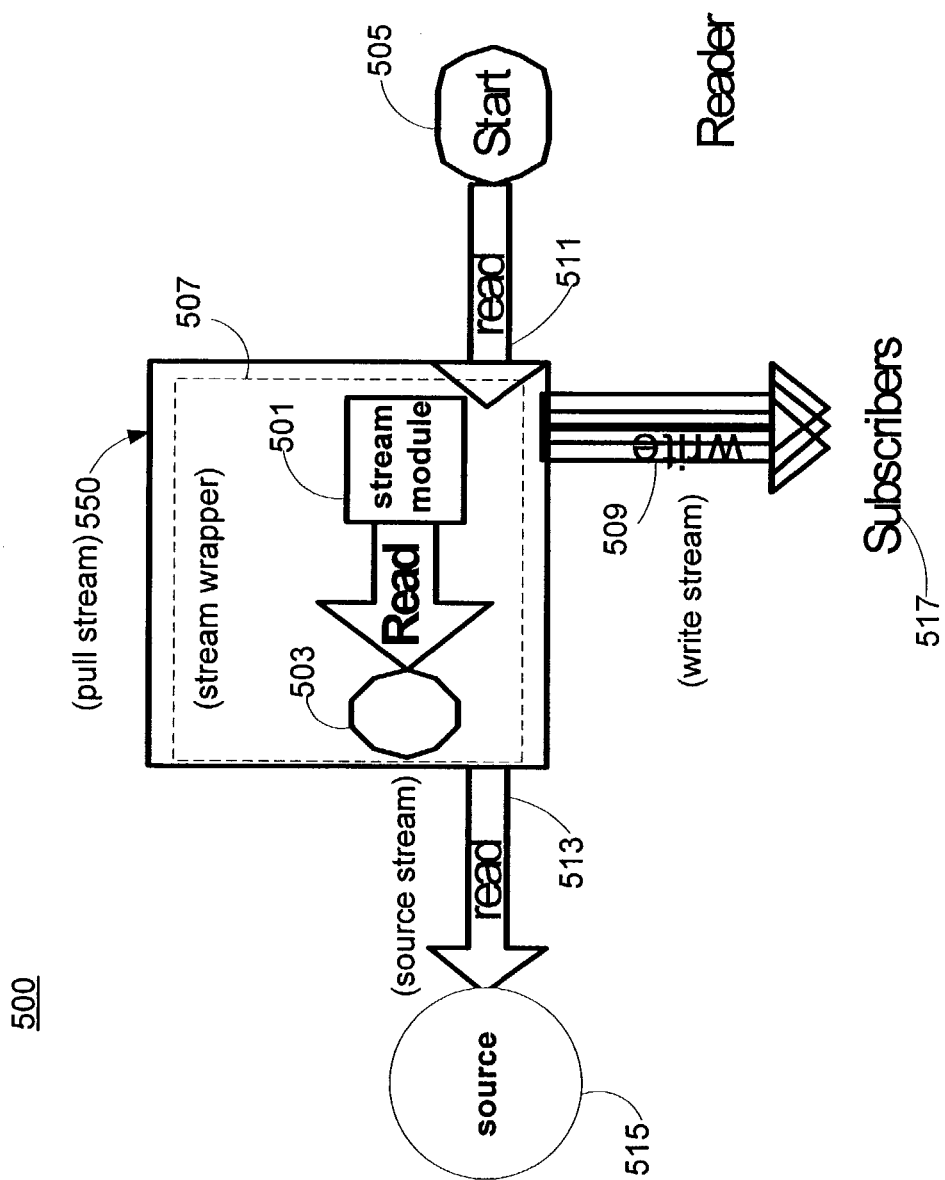
FIG. 5 shows a pull stream configuration according to an embodiment of the invention.

FIG. 5 shows a pull stream configuration 500 according to an embodiment of the invention. With push stream configuration 500, a reader 505 reads sequential data out of pull stream 550 through read stream 511. Pull stream 550 "pulls" data from a source 515 through source stream 513. Alternatively, pull stream 550 may not have a source and may obtain data from the inner stream module (e.g. from a file). Source 515 is a "stream entity" that may be a "stream module" such as a file reader or a "stream wrapper" that is configured as a pull stream. Pull stream 550 supports write stream 509 that may be attached to subscribers 517. As with push stream 450, subscribers 517 may have other subscribers, in which data is provided to other subscribers.

As shown in FIG. 5, pull stream 550 comprises a stream module 501, a file 503, and a stream wrapper 507. Stream wrapper 507 encapsulates stream module 501. Stream wrapper 507 reads data from source 515, as provided to file 503, and instructs stream module 501 to read an amount of data from file 503. Stream wrapper 507 routes data being read to subscribers 517 through write stream 509 (by "pushing") and to reader 505 through read stream 511 (by "pulling").

As with push stream 450, pull stream 550 may be supported by ISequentialStream. ISequentialStream provides forward-only reading and writing of data. A read command, in which pull stream 550 may be generated, may be represented by the following instruction:

HRESULT Read( [out, size_is(cb), length_is(*pcbRead)]
void *pv, [in] ULONG cb, [out] ULONG *pcbRead);

where pv is a pointer of data to be pulled, cb is the size of the data payload to be pulled, and pcbRead is the amount of data that is actually transferred with the read operation.

In the embodiment, pull stream wrapper 507 utilizes ISequentialStream, although other embodiments may support other stream implementations. Stream wrapper 507 intercepts calls to the underlying stream that is supported by stream module 501. As sequential data is transferred from the underlying stream, stream wrapper 507 "sniffs" the sequential data, pulls the data to reader 505, and publishes the data to subscribers 517. Pull stream 550 is configured to support source 515 and subscribers 517 using IStreamConfig methods as will be discussed.

Push stream 550, as supported by ISequentialStream itself, only supports sequential streams between endpoints. Consequently, topologies are not supported with a combination (e.g. chaining) of push and pull streams. However, sequential stream software (e.g. ISequentialStream) is enhanced with a file wrapper and is configured by IstreamConfig. With the enhancement of the sequential stream software, different topologies comprising a mixture of push streams and pull streams may be configured in order to support different applications. In order to add a new subscribers to push stream 450, to add a source, and to clear subscribers and sources, the embodiment uses an AddSubscriber method, a SetSource method, and a ClearReferences method, respectively:

```
INTERFACE(IStreamConfig, IUnknown, "Stream configuration")
{
    //-----------------------------------------------------------------------
    // @cmember AddSubscriber
    //
    STDMETHOD(AddSubscriber)(
        /* [in] */ CComStreamPtr pStream);
    //-----------------------------------------------------------------------
    // @cmember SetSource
    //
    STDMETHOD(SetSource)(
        /* [in] */ CComStreamPtr pStream);
    //-----------------------------------------------------------------------
    // @cmember ClearReferences
    //
    STDMETHOD(ClearReferences)( );
};
```

Figure 6:
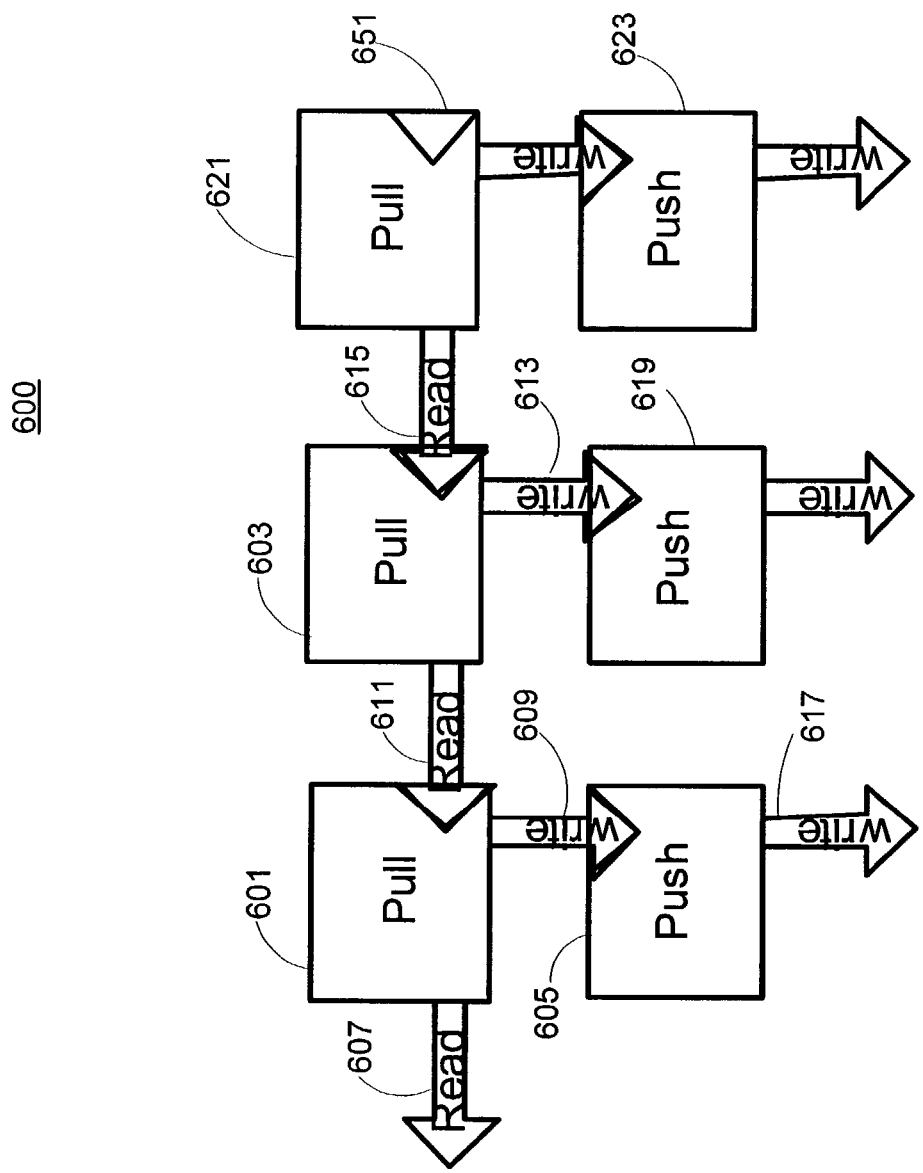
FIG. 6 shows a pull topology according to an embodiment of the invention.

FIG. 6 shows a pull topology 600 according to an embodiment of the invention. Topology 600 comprises a pull stream 601, a pull stream 603, a push stream 605, a push stream 619, a pull stream 621, and a push stream 623. In the embodiment, an agent (not shown) through a port 651 interacts with data processing by pull topology 600 and reads a processed sequential stream. A pull topology, e.g. pull topology 600, may support a web service platform where an agent, e.g. (eXtensible Markup Language (XML) document object model (XMLDOM), may pull data from a stream transformer that in turn decrypts the data that it pulls from the web service.

In accordance with an embodiment of the invention, a pull stream (e.g. pull stream 603) may pull data out of another pull stream (e.g. pull stream 601). Referring to FIG. 6, pull stream 603 obtains a sequential stream through read stream 611 and may direct data to push stream 619 through a write stream 613. With pull topology 600, a list of subscribers is associated with a write stream (e.g. write stream 609 which provides sequential data to push stream 605, where push stream 605 is a subscriber of pull stream 601). Pull stream 601 may obtain sequential data through read stream 607 from a source such as another pull stream (not shown) or from a stream implementation (e.g. file stream) that pull stream 601 encapsulates.

Figure 7:
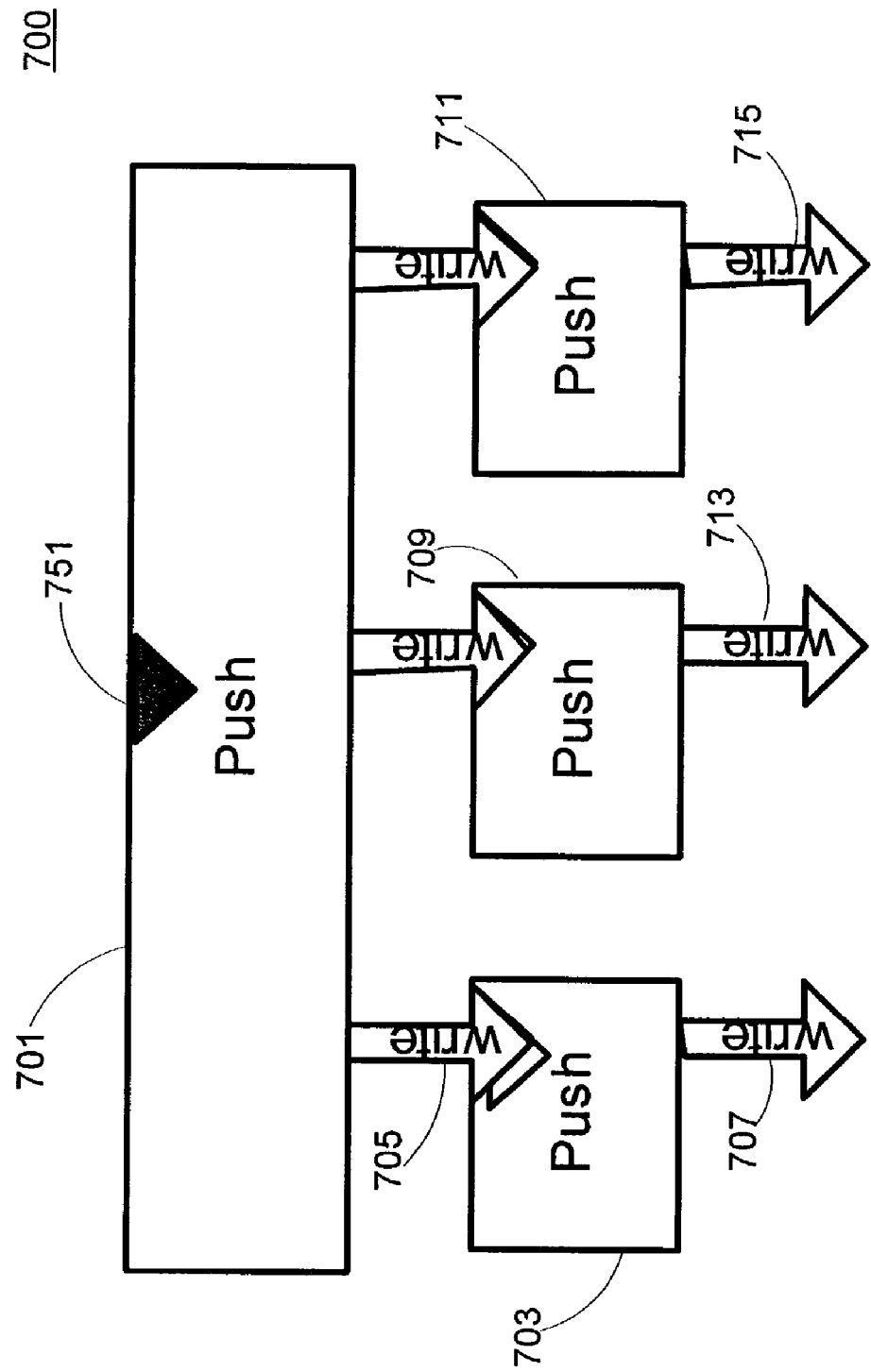
FIG. 7 shows a push topology according to an embodiment of the invention.

FIG. 7 shows a push topology 700 according to an embodiment of the invention. Push topology 700 comprises a push stream 701, a push stream 703, a push stream 709, and a push stream 711. In the embodiment, an XML agent through port 751 interacts with data processing by push topology 700 in which data is pushed from XML agent (through port 751) to subscribers associated with a write stream 707, a write stream 713, and a write stream 715.

Configurations 600 and 700 exemplify embodiments of the invention in which a pipeline may be composed (i.e. configurations 600 and 700 are composable). Composability is the ability to construct a software system from a plurality of components. In the exemplary embodiments shown in FIGS. 6 and 7, configurations 600 and 700 comprise a plurality of push streams and pull streams, in which streams may provide different functions such as transforming and buffering.

Figure 8:
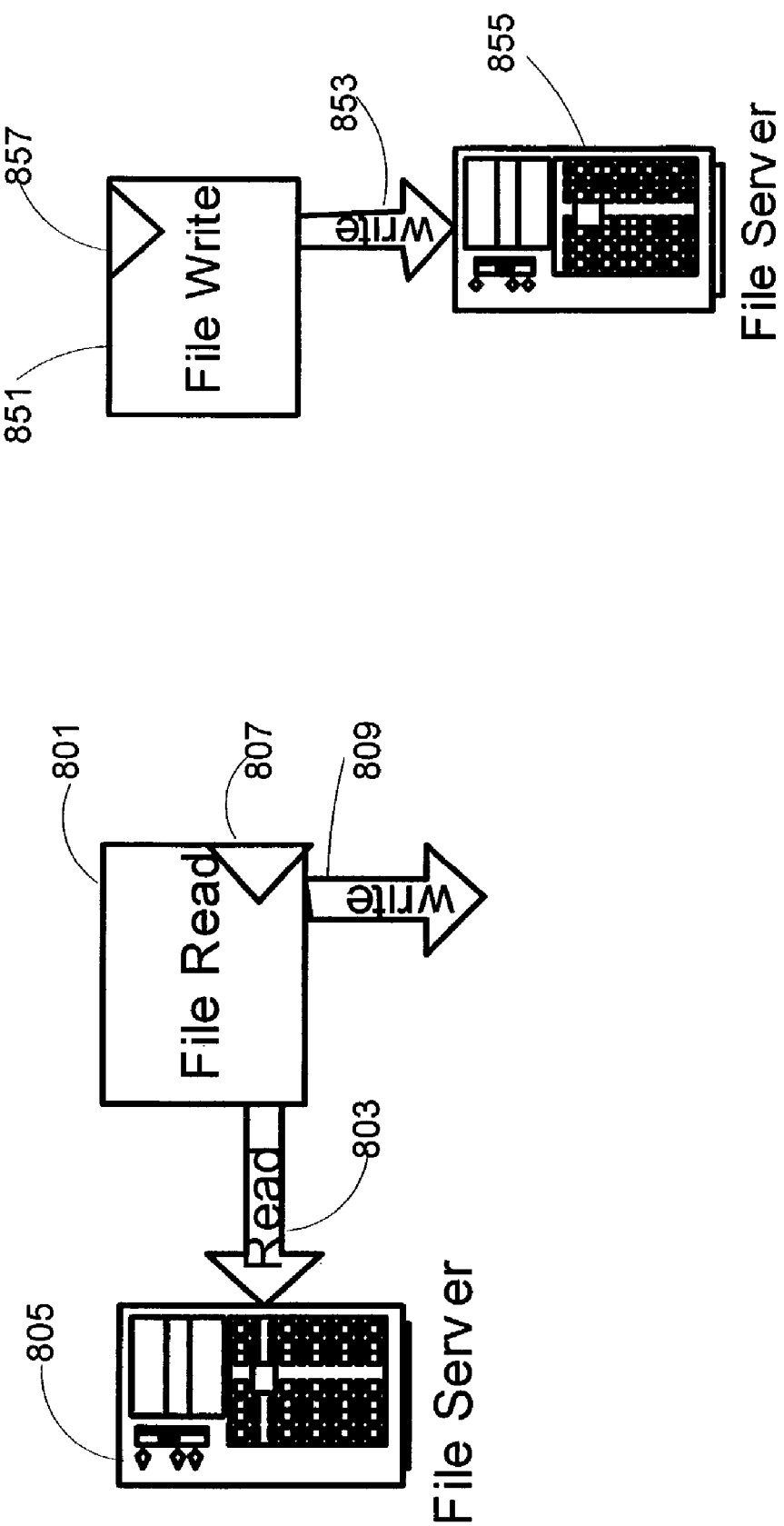
FIG. 8 shows file streams according to an embodiment of the invention.

FIG. 8 shows file streams according to an embodiment of the invention, in which a legacy stream may be integrated with composable streams. A file read 801 is a pull stream that is configured so that file read 801 pulls data from a configured source, e.g. a file server 805, through a read stream 803. File read provides a stream interface for file server 805 because file server 805 does not support a stream interface such as ISequentialStream. Pull stream 801 reads data from file server 805. File read 801 may push sequential data through a write stream 809 to a subscriber (not shown). Sequential data is pulled through a reader port 807 by a reader agent (not shown) or another pull stream.

A file write 851 is a push stream that is configured so that a configured subscriber, e.g. as a file server 855, receives data through a write stream 853. File write 851 provides a stream interface for file server 855 because file server 855 does not support a stream interface. File write 851 receives sequential data through port 857 from a pull stream, another push stream, or an agent.

Figure 9:
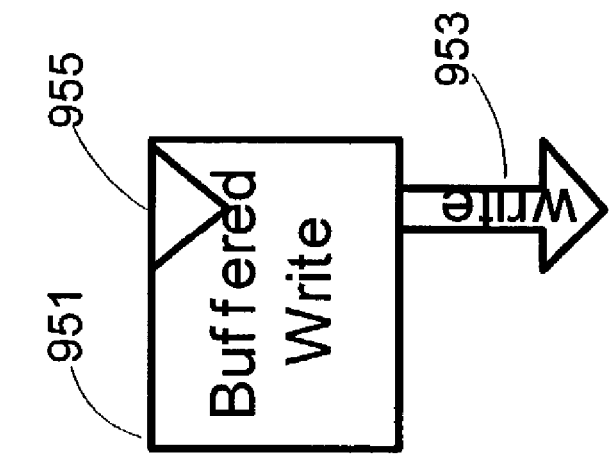
FIG. 9 shows buffered streams according to an embodiment of the invention.
Figure 9:
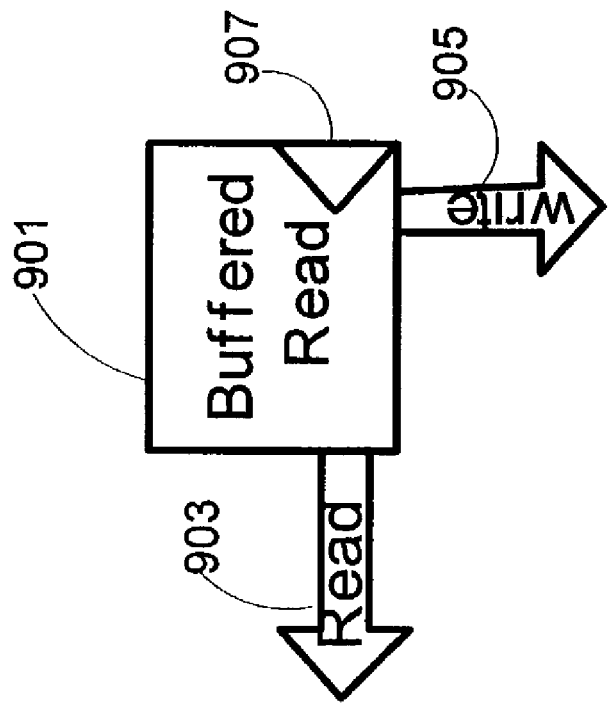

FIG. 9 shows buffered streams according to an embodiment of the invention. A buffered read stream 901 is a pull stream in which a reader (not shown) pulls sequential data through a reader port 907 from a source (not shown) through a read stream 903. "Buffered read" stream 901 processes sequential data from read stream 903 in data segments and buffers the sequential data in a memory buffer. (In the embodiment shown in FIGS. 13 and 14, the corresponding buffer size is 4 KB.) Consequentially, the reader associated with "buffered read" stream 901 may obtain sequential data in data segments of varying sizes. The buffered stream pulls data from the read stream 903 in chunks and parcels out the data from the memory buffer for subsequent requests. Buffered sequential data is pushed to a subscriber through a write stream 905. By chaining file read 801 with buffered read stream 901, a "buffered file stream" may be composed.

"Buffered write" stream 951 is a push stream in which a writer (not shown) pushes data through writer port 955 through a write stream 953. Buffer write stream 951 processes sequential data from the writer (that may occur in data segments) and buffers the data in a buffer having a buffer size. (In the embodiment shown in FIGS. 13 and 14, the buffer size is 4 KB.) In the embodiment, the buffer size that is associated with buffered read 901 and with buffered write 951 may be determined by software associated with buffered read stream 901 and with buffered write stream 951 or may be determined by an inputted configuration from an administrator of a corresponding data system.

As will be discussed in the context of FIGS. 13 and 14, data applications may be engineered in which the memory footprint is reduced by processing sequential data in data segments with a buffered stream, e.g. buffered write stream 951 and buffered read stream 901, rather than processing an entire payload. As an example to illustrate the issue, assume that the size of a payload is 1 MB. The complete payload is stored in a file. In the example, assume that two data transformations (e.g. data inflation and data encryption) are required. The complete payload is read from file into memory, inflated, and stored. Because the payload is inflated, assume that 10 MB of additional memory is required to store the inflated payload. The entire inflated payload is retrieved from memory, encrypted, and stored. Assuming that the payload is not further inflated by the encryption transformation, an additional 10 MB of memory is required. Thus, the total memory for processing one 1 MB payload is 21 MB (1+10+10=21 MB).

By processing sequential data in data segments of 4 KB, the memory footprint, in the above example, may be reduced by processing sequential data that is restrained to a buffer size (e.g. 4 KB) even though data inflation may occur as result of a data transformation. Data is loaded from file on demand in small chunks (size of the buffer) and is not the whole payload. In the above example, the total memory for processing one 1 MB payload is the sum of the intermediate buffers for performing the transformations i.e. 4 KB (corresponding to the buffer for the first transformation) plus 4 KB (corresponding to the buffer for the second transformation). Thus, with the buffering of sequential data, the memory footprint may be restrained essentially to the sum of the buffer sizes and is independent of the size of the payload.

Memory demands are exacerbated if a typical payload is larger and if more data transformations are required to process the payload. In a financial data system, for example, a payload may be typically 20 MB. In the example above, the increased size of the payload corresponds to a total memory demand of 420 MB (20+200+200=420 MB) for each payload. In such a case, with 2 GB of memory, the financial data system may support only four payloads at one given time. If the number of payloads in a unit of time corresponds to more memory than can be supported by the system, the processing of payloads may need to be throttled. Moreover, the number of payloads that need to be processed by the data system may vary appreciably, particularly during the end of a financial period.

Figure 10:
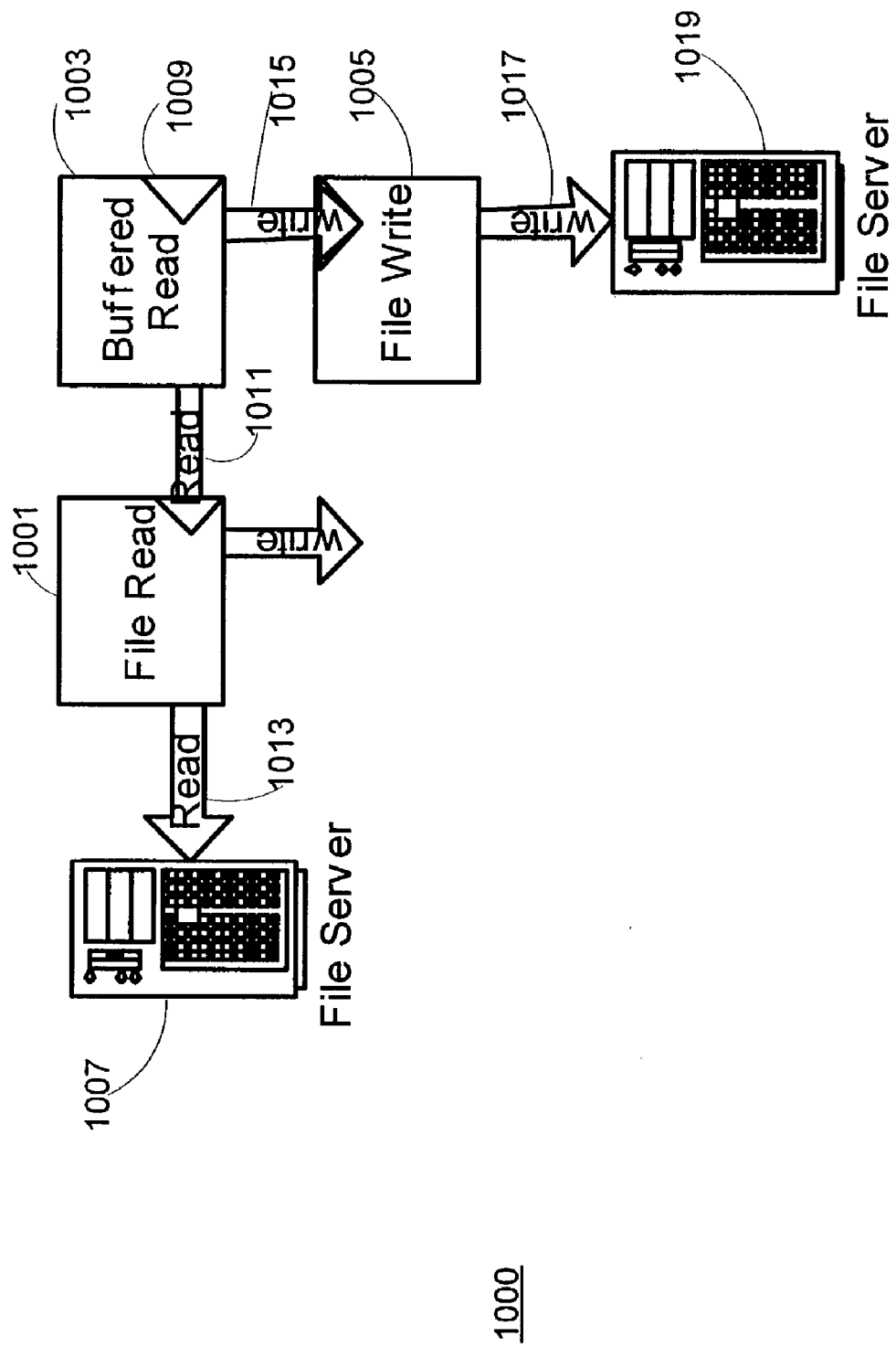
FIG. 10 shows a buffered file stream according to an embodiment of the invention.

FIG. 10 shows a buffered file stream 1000 according to an embodiment of the invention. Buffered file stream 1000 comprises a file server 1007, a file read stream 1001 (corresponding to pull file stream 801 in FIG. 8), a buffered read stream 1003, a file write stream 1005 (corresponding to push stream 851 in FIG. 8), and file server 1019. An agent (not shown), through port 1009, or another pull stream (not shown) directs buffered file stream 1001 to pull data from file server 1007 and push the data to file server 1019. The agent could be a Simple Object Access Protocol (SOAP) interface that supports a web service platform using XML and HyperText Markup Language (HTTP).

Buffered stream 1000 enables data from file server 1007 to be transferred or copied to file server 1019. In the embodiment, either file server 1007 or 1019 may or may not be able to support a stream interface. File read stream 1001 reads from file server 1007 through a read stream 1013. Buffered read stream 1003 processes sequential data from file read stream 1001 through read stream 1011. Sequential data is stored in data segments by buffered read 1003, in which file write stream 1005 processes each data segment that is obtained from buffered read stream 1003. File write stream 1005 pushes data to file server 1019 through write stream 1017.

Figure 11:
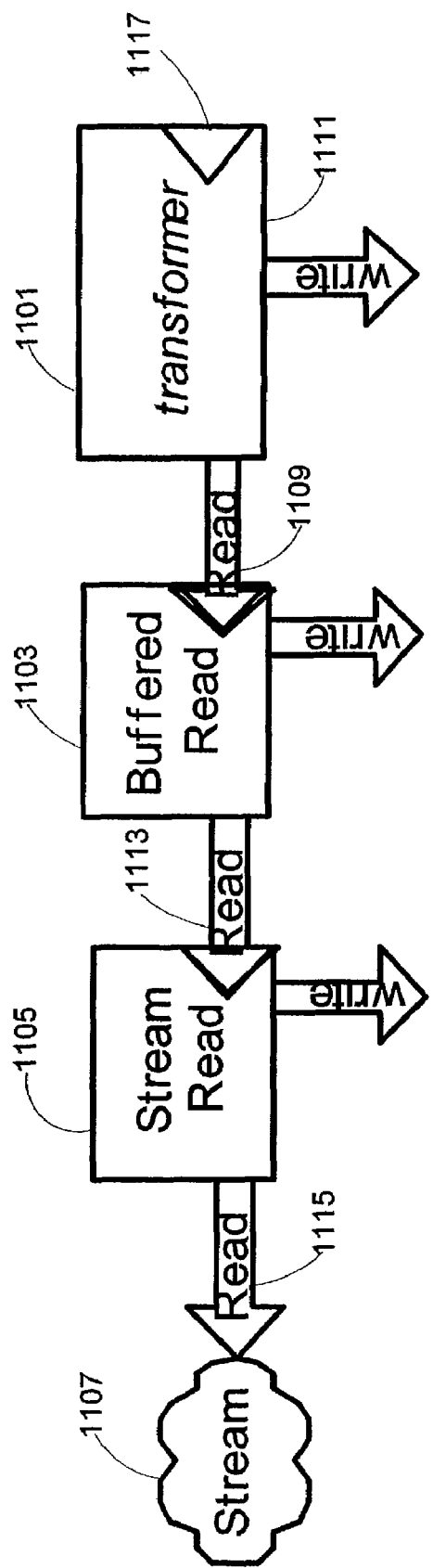
FIG. 11 shows a pull transformer configuration according to an embodiment of the invention.

FIG. 11 shows a pull transformation configuration 1100 according to an embodiment of the invention. A transformer 1101 (configured as a pull stream) transforms sequential data obtained from a buffered read stream 1103 through read stream 1109. Buffered read stream 1103, in turn, obtains sequential data from stream read 1105 through a read stream 1113. Stream read 1105 obtains sequential data from a stream 1107 through read stream 1115. Stream 1107 may be provided by a pull stream or a server.

Transformer 1101 may interact with an agent (not shown) through port 1117. Alternatively, another pull stream may pull transformed data from transformer 1101. The other pull stream may function as a subsequent transformer. Transformer 1101 may support one of different types of transformations, including data inflation, data deflation, data encoding, data decoding, data encryption, data decryption, data concatenation, and data filtering. (For example, data compression, encoding, and encryption correspond to GZip, MIME, and Crypto, respectively.) Transformer 1101 obtains a buffered data segment from buffered read 1103 and transforms the buffered segment in accordance with the associated transformation. Transformer 1101 provides transformed sequential data to a subscriber (not shown) through write stream 1111. The subscriber may be a processing entity, including a push stream or a server. After processing the buffered data segment, transformer pulls a next buffered data segment from buffered read stream 1103 and transforms the next buffered data segment. In some embodiments, transformer 1101 may pull a portion of the buffered segment from buffered read 1103 because the associated transformation (e.g. data inflation) may inflate the buffered data segment. In such a case, only a portion of the buffered data segment is processed by transformer 1101 so that the inflation of the portion results in data that is equal to the size requested by the agent on port 1117.

Figure 12:
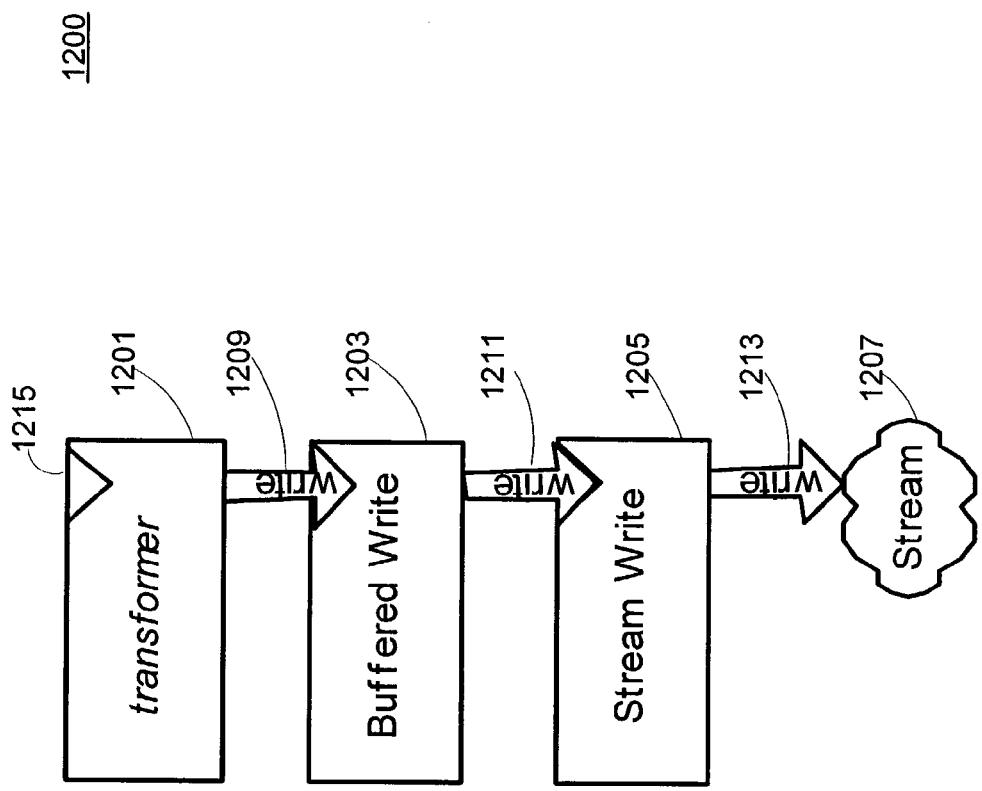
FIG. 12 shows a push transformer configuration according to an embodiment of the invention.

FIG. 12 shows a push transformer configuration 1200 according to an embodiment of the invention. A transformer 1201 (configured as a push stream) transforms sequential data obtained from a write stream through a write port 1215. Transformer 1201 may interface with an agent (not shown), or another push stream. Transformer 1201 may support one of different types of transformations, including data inflation, data deflation, data encoding, data decoding, data encryption, data decryption, data concatenation, and data filtering. Transformer 1201 obtains a data segment from port 1215 and transforms the buffered segment in accordance with the associated transformation. (In other embodiments of the invention, transformer 1201 may receive a data segment from another push stream.) Transformer 1201 provides transformed sequential data to a buffered write stream 1203 (configured on a subscriber list of transformer 1201) through a write stream 1209. Buffered write 1203 buffers a stream from write stream 1209. Buffered write stream 1203 stores a data segment when transformer 1201 completes transforming the data segment. A stream write 1205 provides a sequential stream data to a stream 1207 through write stream 1213. Stream 1207 may be supported by another processing entity such as a push stream or a server.

Figure 13:
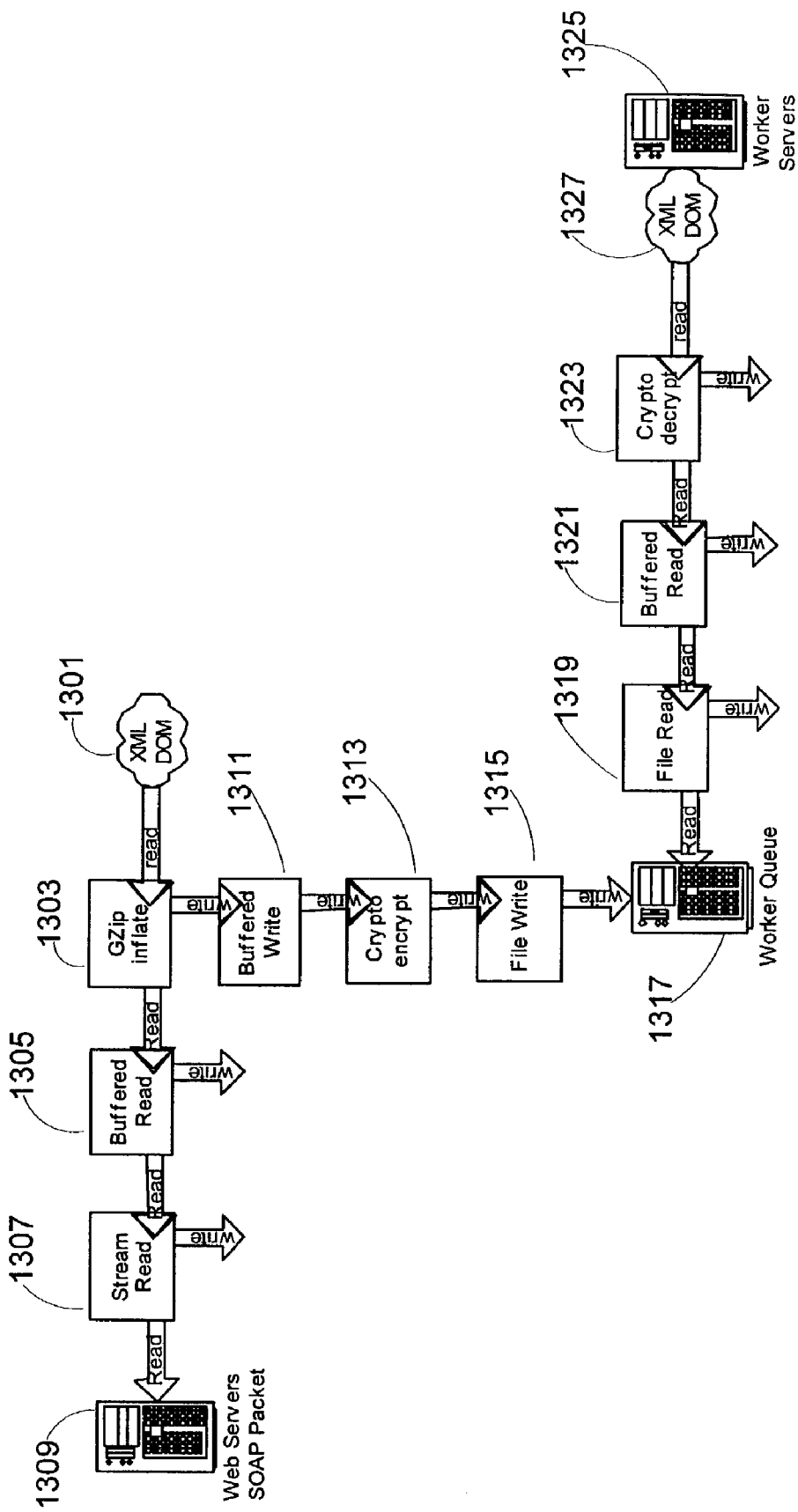
FIG. 13 shows a data flow to a worker queue and a queued data flow to a worker server according to an embodiment of the invention.

FIG. 13 shows a data flow to a worker queue 1317 and a queued data flow to a worker server 1325 according to an embodiment of the invention. Architectures 1300 and 1400 shown in FIG. 13 and FIG. 14, respectively, parallel server network 200 that supports data provider 212 as shown in FIG. 2. A web server 1309 corresponds to SOAP server 217 and a worker server 1325 corresponds to worker server 223. In the embodiment, worker queue 1317 is implemented at web server 1309, although other embodiments may implement worker queue 1317 at another entity of architecture 1300, including a separate server. Web server 1309 receives investment data for clients from a computer (such as computer 215). A corresponding sequential data from web server 1309 is pulled by a stream read 1307 (corresponding to stream read 1105 in FIG. 11) and buffered by a buffered read 1305. Buffered read 1305 pulls data from stream read 1307 in 4 KB segments. A GZip inflate transformer stream 1303 (configured as a pull stream corresponding to 1017 in FIG. 10) inflates the sequential data from buffered read 1305. Sequential data pulled by transformer 1303 is validated against a schema presented through a XMLDOM 1301 that is presented by an agent (not shown). Because data inflation, as performed by transformer 1303 increases the size of a data segment, transformer 1303 pulls a portion of a data segment just enough so that it inflates to the right amount. Transformer 1303 inputs data one byte at a time and inflates the data until the amount of data requested by the agent is fulfilled.

A crypto encrypt transformer 1313 (configured as a pull stream corresponding to transformer 1115 in FIG. 11) encrypts sequential data from buffered write 1311 (corresponding to buffered write 1103 in FIG. 11) in a 4 KB data segment and presents the processed sequential data to a file write 1315 (corresponding to file write 905 in FIG. 9). Encrypted data is stored at worker queue 1317 in order to enhance security. Data from file write 1315 (which provides a streams interface for worker queue 1317) is presented to a worker queue 1317, from which a worker server 1325 may later retrieve the data. Data is persisted to worker queue 1317, which may be shared by a plurality of worker servers, for asynchronous processing.

Worker server 1325 may wait for batches of data to arrive at worker queue 1317. Worker server 1325 retrieves data from worker queue 1317 and processes the data in accordance with a XMLDOM 1327. Data is converted into a sequential data by a file read 1319 and buffered in 4 KB data segments by a buffered read 1321. A crypto decrypt transformer 1323 decrypts each data segment, which is pulled by worker server 1325.

Figure 14:
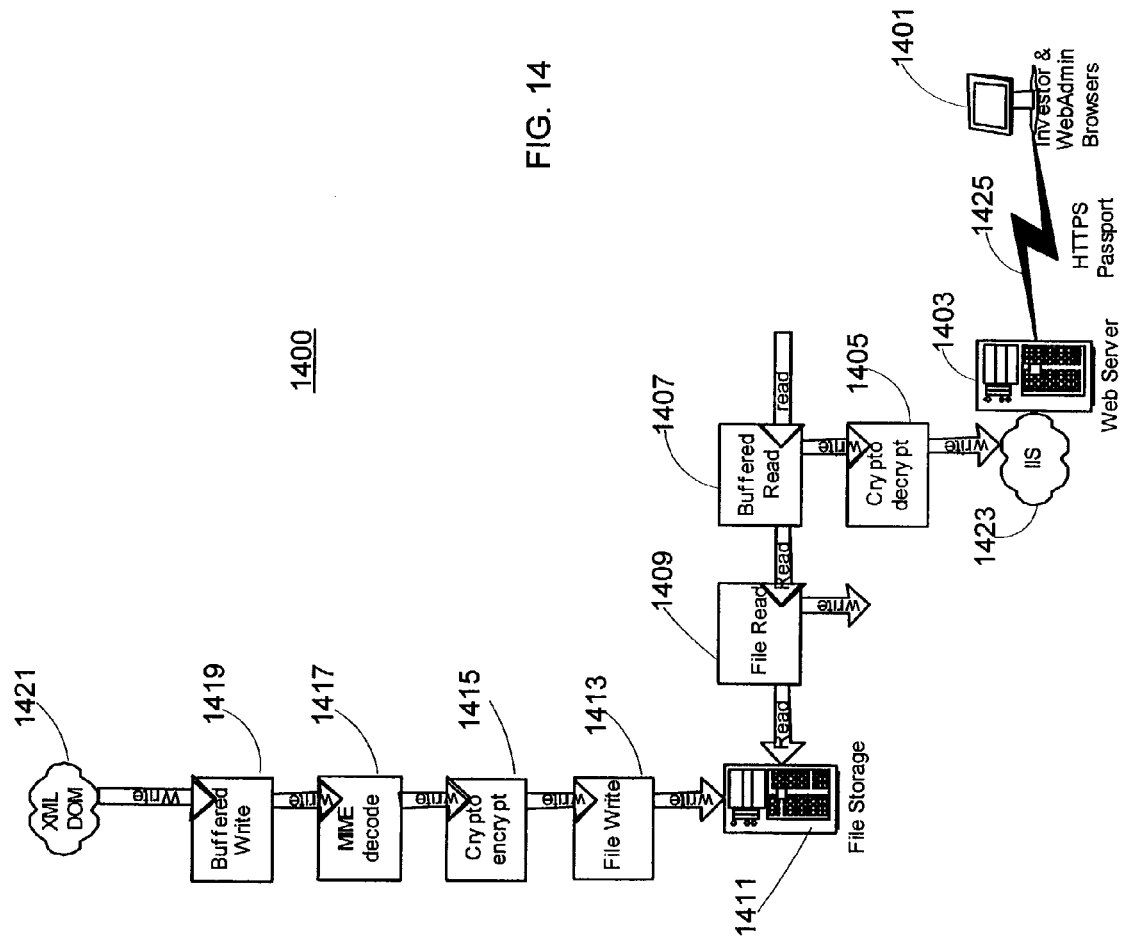
FIG. 14 shows an exemplary configuration of a data flow of documents that is persisted to a secured file store and a data flow for documents that are retrieved from the secured file store.

FIG. 14 shows an exemplary configuration of a data flow of documents that is persisted to a secured file store 1411 (which may correspond to SQL server 211 or file server 213 in FIG. 2) and a data flow of documents that is retrieved from the secured file store by an investor 1401. An agent, through XMLDOM 1421, transfers data to file storage 1411 from worker server 1325. Depending on the document type, data is transferred to an appropriate file store. For example, referring to FIG. 2, portfolios are transferred to SQL server 211 and report documents are transferred to file server 213. However, data stored in new-quotes server 209 (typically quotes and news that are not investor-sensitive) are typically provided by another service server (not shown). Data is transferred from worker server 1325 to file server 1411 through a buffered write stream 1419, a MIME decode transformer 1417, a crypto encrypt transformer 1415, and a file write 1413 that provides a stream interface for file storage 1411. Data is stored on file storage 1411 for later retrieval by investor 1401 if investor 1411 has permissions to retrieve the requested document. Web server 1403 corresponds to web server 203 (in FIG. 2) and investor 1401 corresponds to investor 201.

When investor 1401 wishes to retrieve a document, such as financial data about the investor's account, investor 1401 accesses web server 1403 through a secure HTTP connection 1425. Web server 1403 may support an Internet connection as with Internet Information Server (IIS) 1423 that resides on web server 1403. In response to the investor's request, web server 1403 retrieves the requested document through a file read 1409, a buffered read 1407, and a crypto decrypt transformer 1405. Transformer 1405 decrypts the requested document by processing each data segment that corresponds to the requested document.

In other embodiments of the invention, the architecture as shown in FIGS. 13 and 14 may support different applications that require stream information.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

I claim:

1. A method for managing a data flow, the method comprising:

composing a serial arrangement of at least first, second, and third stream components as a pipeline for incrementally transferring a sequential dataset from a source to at least one destination;

using the first stream component in the serial arrangement to sequentially route increments of the dataset from the source to the second stream component;

using the second stream component in the serial arrangement to sequentially buffer each of the increments of the dataset received from the first stream component in a buffer, and to route each of the buffered increments of the dataset to the third stream component before a subsequent increment of the dataset is received from the first stream component to be buffered; and using the third stream component in the serial arrangement to sequentially perform a data transformation on each of the increments of the dataset received from the second stream component, and to route each of the transformed increments of the dataset to the at least one destination before a subsequent increment of the dataset is received from the second stream component to be transformed, wherein the size of each of the increments of the dataset routed by the first stream component corresponds to the size of the buffer in order to limit memory usage of the serial arrangement to the size of the buffer for each data increment, and wherein each of the first, second, and third stream components includes a stream wrapper encapsulating a stream module, the stream wrapper instructing the stream module to perform a read or write operation on a data file for an amount of data corresponding to the size of the buffer.

2. The method of claim 1, wherein the at least one destination includes at least one subscriber to which the third stream component writes each of the transformed increments of the dataset, and the method further comprises:

receiving a configuration command at a stream wrapper that is associated with the serial arrangement and that associates the serial arrangement with a first source and a first subscriber list, wherein the at least one subscriber is associated with the first subscriber list, and wherein the source is associated with the first source.

3. The method of claim 2, wherein the configuration command corresponds to an IConfigStream message.

4. The method of claim 2, wherein the serial arrangement forms a transformed sequential dataset in accordance with the data transformation of the dataset.

5. The method of claim 4, wherein the data transformation is selected from the group consisting of a data inflation, a data deflation, a data encoding, a data decoding, a data encryption, a data decryption, a data concatenation, and a data filtering.

6. The method of claim 4, wherein:

the first stream component performs a pull operation by sequentially reading the increments of the dataset from a data file in the source, the method further comprising:

utilizing a fourth stream component to perform a pull operation by sequentially reading increments of the dataset transformed by the third stream component from the source; and utilizing a fifth stream component to sequentially perform a second data transformation on the increments of the transformed dataset that is read from the fourth stream component.

7. The method of claim 4, wherein:
the first stream component performs a pull operation by sequentially reading the dataset from a data file in the source, and
the at least one subscriber is a serial arrangement of fourth, fifth, and sixth stream components adapted to incrementally transfer the transformed dataset to a subsequent subscriber,
the method further comprising:
using the fourth stream component to sequentially buffer the increments of the transformed dataset received from the third stream component,
using the fifth stream component to perform a second data transformation on the increments of the transformed dataset, and
using the sixth stream component to perform a push operation by sequentially writing each of the increments transformed by the fifth stream component to a data file in the subsequent subscriber.

8. The method of claim 2, wherein the first source does not support a stream interface, the method further comprising:
using the first stream component in the serial arrangement to provide a stream interface to the first source.

9. The method of claim 8, wherein the first source is a storage device.

10. The method of claim 2, wherein the at least one subscriber associated with the first subscriber list does not support a stream interface, further comprising:
using the fifth stream component in the serial arrangement to provide a stream interface to the at least one subscriber.

11. The method of claim 10, wherein the at least one subscriber includes a storage device.

12. The method of claim 1, wherein the at least one destination comprises a plurality of subscribers to which the third stream component writes each of the transformed increments of the dataset.

13. The method of claim 1, wherein the first stream component performs a pull operation by sequentially reading the increments of the dataset from a data file in the source.

14. The method of claim 13, wherein the source is a stream component.

15. The method of claim 13, wherein
the at least one destination includes a subscriber to which the third stream component writes each of the transformed increments of the dataset, and
the subscriber comprises a fourth stream component adapted to perform a push operation by sequentially writing the increments of the transformed dataset obtained from the third stream component to a subsequent subscriber.

16. The method of claim 15, further comprising:
receiving a second configuration command at a stream wrapper that is associated with the fourth stream component and that indicates a second subscriber list.

17. The method of claim 16, wherein a sixth stream component is associated with the second subscriber list.

18. The method of claim 16, wherein the second configuration command corresponds to an IConfigStream message.

19. The method of claim 15, further comprising:
utilizing a fifth stream component to be the subsequent subscriber and to sequentially perform a second data transformation on the increments of the transformed dataset obtained from the fourth stream component.

20. The method of claim 19, further comprising:
utilizing a sixth stream component to perform a third data transformation on the transformed dataset obtained from the fifth stream component.

21. The method of claim 1, wherein the data transformation performed by the third stream component is at least one of: data encryption, data decryption, data inflation, and data compression.

22. The method of claim 21, wherein
the source is in a first server and the dataset is embodied as a first data file in the first server, and
the stream wrapper of the first stream component instructs the stream module of the first stream component to sequentially read amounts of data from the first data file corresponding to the size of the buffer.

23. The method of claim 22, wherein
the at least one destination includes a second server, and
the stream wrapper of the third stream component instructs the stream module of the third stream component to sequentially write an amount of data from the transformed increments of the dataset to a second data file in the second server.

24. A computer-readable storage medium having computer-executable instructions for performing the method recited in claim 1.

25. A computer-readable storage medium having computer-executable instructions for performing the method recited in claim 14.

26. A computer-readable storage medium having computer-executable instructions for performing the method recited in claim 2.

27. A computer-readable storage medium having computer-executable instructions for performing the method recited in claim 16.

28. A computer-readable storage medium having computer-executable instructions for performing the method recited in claim 4.

29. A computer-readable storage medium having computer-executable instructions for performing the method recited in claim 19.

30. An apparatus that manages a data flow, the apparatus comprising:
a first pipeline composed of a serial arrangement of at least first, second, and third stream components adapted to transfer a sequential dataset in increments from a source to a destination; and
a memory including a first buffer,
wherein the first, second, and third stream components are adapted so that:
the first stream component sequentially routes increments of the dataset from the source to the second stream component;
the second stream component sequentially buffers each of the increments of the dataset received from the first stream in the first buffer, and routes each of the buffered increments of the dataset to the third stream component before a subsequent increment of the dataset is received from the first stream component to be buffered; and
the third stream component sequentially performs a first data transformation on each of the increments of the dataset, and routes each of the transformed increments to the destination before a subsequent increment of the data set is received from the second stream component to be transformed, wherein the size of each of the increments of the dataset routed by the first stream component corresponds to the size of the first buffer in order to limit memory usage of the serial arrangement to the size of the buffer, and wherein each of the first, second, and third components includes a stream wrapper encapsulating a stream module, the stream wrapper instructing the stream module to perform a read or write operation on a data file for an amount of data corresponding to the size of the buffer.

31. The apparatus of claim 30, wherein the first stream component performs a pull operation by sequentially reading the increments of the dataset from a data file in the source, the apparatus further comprising:

a fourth stream component that performs a pull operation by sequentially reading the transformed dataset from a data file in the first subscriber.

32. The apparatus of claim 31, wherein the fourth stream component performs a second data transformation on the transformed dataset obtained from the third stream component.

33. The apparatus of claim 30, wherein the destination is a first subscriber to which the third stream component writes each of the transformed increments of the dataset, wherein the first subscriber is a second pipeline composed of a second serial arrangement of fourth, fifth, and sixth stream components adapted to incrementally write the transformed dataset, which is obtained from the first pipeline, in increments to a second subscriber, wherein the fourth, fifth, and sixty streams are adapted so that:

the fourth stream component sequentially buffers increments of the transformed dataset in a second buffer, the fifth stream component performs a second data transformation on the increments of the transformed dataset, and the sixth stream component sequentially writes each of the increments transformed by the fifth stream component to a data file in the second subscriber, and wherein memory usage of the second serial arrangement is limited to the size of the second buffer.

34. The apparatus of claim 33, wherein the second pipeline comprises a first push stream, the apparatus further comprising:

a seventh stream component, which is the second subscriber, that pushes the data to at least one third subscriber.

35. The apparatus of claim 30, wherein the data transformation performed by the third stream component is at least one of: data encryption, data decryption, data inflation, and data compression.

36. The apparatus of claim 35, wherein the source is in a first server and the dataset is embodied as a first data file in the first server, and the stream wrapper of the first stream component instructs the stream module of the first stream component to sequentially read amounts of data from the first data file corresponding to the size of the buffer.

37. The apparatus of claim 36, wherein the destination is in a second server, and the stream wrapper of the third stream component instructs the stream module of the third stream component to sequentially write an amount of data from the transformed increments of the dataset to a second data file in the second server.

38. A method for managing a data flow between first and second storage locations in one or more computers, the method comprising:

composing a serial arrangement of stream components as a pipeline for incrementally transferring a sequential dataset from a first data file in the first storage location to a second data file in the second storage location;

using a first stream component in the serial arrangement to sequentially read increments of the dataset from the first data file and sequentially route the increments to the second stream component;

using a second stream component in the serial arrangement to sequentially buffer each of the increments of the dataset received from the first stream component in a buffer, and to route each of the buffered increments of the dataset to the third stream component before a subsequent increment of the dataset is received from the first stream component to be buffered;

using the third stream component in the serial arrangement to sequentially perform a data transformation on each of the increments of the dataset received from the second stream component, and to route each of the transformed increments of the dataset to a fourth stream component before a subsequent increment of the dataset is received from the second stream component to be transformed; and using a fourth stream component in the serial arrangement to sequentially write each of the transformed increments received from the third stream component to the second data file, wherein the size of each of the increments of the dataset routed by the first stream component corresponds to the size of the buffer in order to limit memory usage of the serial arrangement to the size of the buffer for each data increment, and wherein each of the stream components in the serial arrangement includes a stream wrapper encapsulating a stream module, the stream wrapper instructing the stream module to perform a read or write operation on a data file for an amount of data corresponding to the size of the buffer.

39. The method of claim 38, wherein the first and second storage locations are located in different computers.

* * * * *